Oct. 9, 1928.
C. J. WITT
1,687,413
WALL HOOK
Filed Oct. 1, 1926
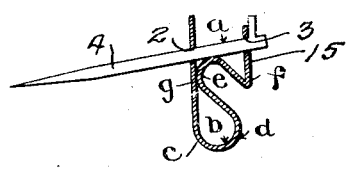
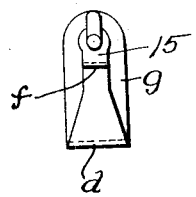
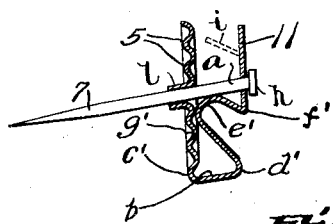
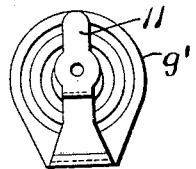
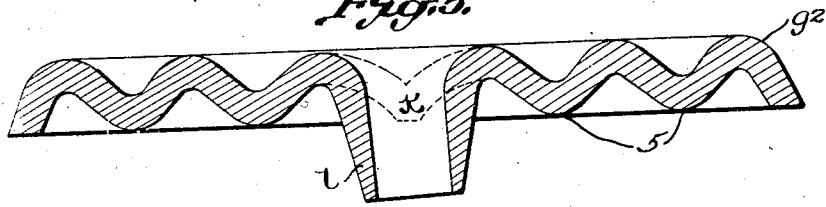
INVENTOR
Carl J. Witt
BY
ATTORNEYS Patented Oct. 9, 1928.

1,687,413

UNITED STATES PATENT OFFICE.

CARL J. WITT, OF SAO PAULO, BRAZIL.

WALL HOOK.

Application filed October 1, 1926. Serial No. 138,993.

My invention relates to improvements in a washer in connection with a nail that is to be driven into a wall for supporting a picture, mirror or the like, and the invention consists in the combinations, constructions and arrangements herein described and claimed.

An object of the invention is the provision of a device of the character described which affords facilities for supporting and reinforcing mortar or masonry under and around the nail and for bracing the nail.

A further object of the invention is the provision of a device of the character described which will obviate any bending moment of the nail and will support the load so that the only effect on the nail will be in the nature of a shearing stress.

Other objects and advantages of the invention will be apparent from the following description considered in conjunction with the accompanying drawings, in which:—

Figure 1 is a front elevation of one form of device embodying the invention,

Figure 2 is a vertical section through the washer and associated bracing structure of the device exhibited in Figure 1, with the nail in side elevation, Figure 3 is a front elevation of a slightly modified form of the device, Figure 4 is a view similar to Figure 2, showing the modification exhibited in Figure 3, Figure 5 is a relatively enlarged sectional view of a washer similar to that which is included in the form of the device exhibited in Figures 3 and 4.

The form of the device shown in Figures 1 and 2 includes a washer $g$. The washer $g$ may be a relatively wide end portion of a strip of metal which also includes a portion bent from the lower edge of the washer in an outward direction substantially along an arc of a circle, as indicated at $c$—$d$, and then being bent upwardly and rearwardly against the washer $g$, thus producing the supporting eye or loop $b$. The remaining portion of the strip then is bent to produce the inclined substantially inverted U-shaped bracing member $e$. The upper arm of the bracing member $e$ is bent vertically in an upward direction intermediate its length at $f$, to provide the bill or lip 15 of an upper supporting hook. The washer $g$ and the bill 15 of the upper supporting hook are provided with openings 2 and 3, respectively, through which a nail 4 may be projected into a wall, not shown, or other supporting structure. The openings 2 and 3 are substantially in alignment with each other although the opening 3 is preferably located at slightly a higher level than the opening 2, so that the nail will be slightly inclined, and the openings 2 and 3 are so located in the washer $g$ and the bill 15 of the upper hook, that the portion of the nail that extends between the washer $g$ and the bill 15 will rest on the substantially inverted U-shaped brace $e$, as clearly shown in Figure 2.

The construction shown in Figures 3 and 4 has a washer $g'$, which is formed with a series of concentric corrugations and with the edge of the washer flush with the backs of the bottoms of the grooves 5, of such corrugations.

The form of the device exhibited in Figures 3 and 4 has a loop or eye member $b'$, a bracing member $e'$ and an upper hook having a bill or lip 11. This bill or lip 11 may be formed with an opening 6, which is located slightly above the level of the center of the washer $g'$, but in line with the latter. The central portion of the washer $g'$ is imperforate initially, but is slightly indented in the manner indicated at $k$, in Figure 5, so that the nail 7 when driven through the central portion of the washer $g'$ will produce a tubular extension such as indicated at 1, in Figures 4, and 5. It may be noted at this point that the only difference between the washer shown in Figure 5 and the washers shown in Figures 3 and 4, is that the washer shown in Figures 3 and 4 has the hereinbefore described supporting and bracing members $b'$, $e'$ and 11, associated therewith, and the supporting and bracing structure is omitted when the form of the device shown in Figures 5, 6 and 7 is employed. The washer shown in Figures 5, 6 and 7 have been designated $g^2$.

It will be understood that the article that is to be suspended from the device ordinarily will be provided with a cord or ring which can be hooked over the device at $a$, in Figure 1, or at $a'$, in Figure 4. The imposition of the load on the nail at $a$, in Figure 2 will cause a bending stress on the portion $c$—$d$ of the supporting loop and under the influence of the load, the portion $d$—$e$ will be pressed firmly against the washer $g$. If the load is applied on the nail, as at $a1$ in Figure 4, the portion $c$—$d$ of the loop will be subjected to a bending stress and the portion $d'$—$e'$ will be bent against the washer $g'$ and will brace the nail. If the load is carried by the loop $b$ of Figure 2, the portion $d-e$ tends to draw the portion $e-f$ against the washer $g$. If the load is supported from the loop $b'$ of Figure 4, the portion $d'-e'$ tends to draw the portion $e'-f'$ against the washer $g'$. In both cases the greater the load the better the mortar or masonry of the associated wall will be supported and reinforced under the nail. The construction thus has elasticity and protects the mortar or masonry of the associated wall. It is obvious that the objects may be suspended both from the upper hook and the lower loop of either of the forms of the device which are exhibited in Figures 2 and 4. If desired, the upper portion of the bill or lip 11 may be bent inwardly to the position indicated at $i$, in Figure 4 for the purposes of preventing displacement of the supporting cord or ring of the suspended object from the upper hook. It will be obvious that the mortar or masonry of the wall into which the nail of the device is driven will be well supported and reinforced under and around the place at which the nail enters the wall, which is the point at which a rupture or crumbling of the masonry or mortar is most likely to occur when an object is suspended from a nail that is driven into the wall.

The corrugations of the washer shown in Figures 4 and 5 strengthen the washer and brace the mortar or masonry of the associated wall. The friction between the backs of the grooves of the corrugations and the edges of a washer of the type shown in Figures 4 and 5 will aid in supporting the load. When the central portion of the washer is imperforate initially and the nail is driven through the washer into the wall, while the washer is held against the wall, small particles of the mortar will enter the joint between the nail and the inner wall of the tubular extension 1, so that the nail will be firmly wedged in place in the tubular extension.

The corrugated washer shown in Figure 5, will be held tight against the wall by the friction that is caused when the nail is driven through the washer into the wall, and the hereinbefore mentioned tubular extension 1 is produced. The point of the nail will be protected and guided by the indented central portion of the associated washer, while the nail is being driven through the washer, and will not curve as easily with the protection of the washer as without such protection.

I claim:—

1. In a wall hook, a wall engaging member, an S-shaped member attached thereto and arranged in advance thereof and terminating in a vertical extension, the extension and wall engaging member having coinciding openings therein, and a pin passing through the openings and engageable with the wall and resting on one of the curves of the S-shaped member whereby to sustain the load placed on the pin.

2. In a wall hook, a length of metal fashioned to afford a longitudinally extending wall engaging leg, and a member in advance thereof terminating in a vertical extension, the leg having an opening therein so disposed that a pin passed therethrough to engage a wall will rest upon the member to sustain the load placed on the pin, the extension projecting above the pin to afford a beak and provided with an opening to receive one end of the pin.

3. In a wall hook, a length of metal fashioned to afford a longitudinally extending wall engaging leg, and an S-shaped member in advance thereof terminating in a vertical extension, the extension and leg having coinciding openings therein to receive a wall engaging pin, the pin resting on one of the curves of the S-shaped member to sustain the load placed on the pin.

4. In a wall hook, a wall engaging member, a structure in advance of said member being formed to define one or more returns, one element of which connects with said member and another terminates in an upright extension, and a pin passing through said wall engaging member and extension resting on one of said returns.

5. In a wall hook, a length of metal fashioned to afford a longitudinally extending wall engaging leg, and a member in advance thereof terminating in an extension having an upward direction, the leg having an opening therein so disposed that a pin passed therethrough to engage a wall will rest upon the member to sustain the load placed on the pin, the extension projecting above the pin to afford a beak and provided with an opening to receive one end of the pin.

CARL J. WITT.